US012270659B2

United States Patent
Fu et al.

(10) Patent No.: US 12,270,659 B2
(45) Date of Patent: Apr. 8, 2025

(54) POSITIONING METHOD AND APPARATUS, DEVICE, SYSTEM, MEDIUM AND SELF-DRIVING VEHICLE

(71) Applicant: Beijing Baidu Netcom Science Technology Co., Ltd., Beijing (CN)

(72) Inventors: Xiangyu Fu, Beijing (CN); Guowei Wan, Beijing (CN); Yao Zhou, Beijing (CN); Liang Peng, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 236 days.

(21) Appl. No.: 17/950,799

(22) Filed: Sep. 22, 2022

(65) Prior Publication Data
US 2023/0100734 A1    Mar. 30, 2023

(30) Foreign Application Priority Data

Sep. 24, 2021   (CN) .......................... 202111122142.1

(51) Int. Cl.
*G01C 21/30*    (2006.01)
*G06T 7/73*    (2017.01)

(52) U.S. Cl.
CPC ............... *G01C 21/30* (2013.01); *G06T 7/74* (2017.01)

(58) Field of Classification Search
None
See application file for complete search history.

(56) References Cited

U.S. PATENT DOCUMENTS

| | | | |
|---|---|---|---|
| 2019/0226852 A1* | 7/2019 | Xie | G01C 21/20 |
| 2020/0098135 A1* | 3/2020 | Ganjineh | G06T 7/74 |
| 2021/0209792 A1* | 7/2021 | Zhou | G01C 21/28 |
| 2021/0223046 A1* | 7/2021 | Li | G05D 1/0274 |

(Continued)

FOREIGN PATENT DOCUMENTS

| | | |
|---|---|---|
| CN | 111179324 A | 5/2020 |
| CN | 112241010 A | 1/2021 |

(Continued)

OTHER PUBLICATIONS

First Office Action mailed on Apr. 13, 2020 for Chinese Patent Application No. 202111122142.1 w/English translation.

(Continued)

*Primary Examiner* — Keith D Bloomquist
(74) *Attorney, Agent, or Firm* — Hunton Andrews Kurth LLP

(57) ABSTRACT

Exemplary positioning method and apparatus, a device, a system, a medium and a self-driving vehicle are provided. The positioning method includes determining, according to the current frame of point cloud data collected by a to-be-positioned terminal in a travelling environment, the current key point in the current frame of point cloud data and a point cloud distribution feature of the current key point; selecting, according to point cloud distribution features associated with reference key points in a global positioning map and the point cloud distribution feature of the current key point, a target key point matching the current key point from the reference key points; and determining, according to reference pose data associated with the target key point, the current pose data of the to-be-positioned terminal.

17 Claims, 10 Drawing Sheets

(56) References Cited

U.S. PATENT DOCUMENTS

2021/0350170 A1* 11/2021 Xie .................. G06F 16/29
2023/0196613 A1* 6/2023 Araújo ............... H04W 12/033
                                                                         382/103

FOREIGN PATENT DOCUMENTS

| CN | 112862874 A | 5/2021 |
| CN | 111179324 B | 5/2023 |
| JP | 2021 514885 A1 | 6/2021 |

OTHER PUBLICATIONS

Second Office Action mailed on Aug. 3, 2022 or Chinese Patent Application No. 202111122142.1 w/English translation.
Notice of Reasons for Refusal mailed on Sep. 14, 2023 for Japanese Patent Application No. 2022-148852 w/English Translation.
R. Qi Charles et al., "PointNet: Deep Learning on Point Sets for 3D Classification and Segmentation," 2017 IEEE Conference on Computer Vision and Pattern Recognition (CVPR), Jul. 26, 2017.
European Search Report dated Feb. 20, 2023 for European Patent Application No. 22197036.1.
Kim Hansung et al: "Influence of Colour and Feature Geometry on Multi-modal 3D Point Clouds Data Registration", 2014 2nd International Conference on 3D Vision, IEEE, vol. 1, pp. 202-209, Dec. 8, 2014.

* cited by examiner

POSITIONING METHOD AND APPARATUS, DEVICE, SYSTEM, MEDIUM AND SELF-DRIVING VEHICLE

CROSS-REFERENCE TO RELATED APPLICATION(S)

This application claims priority to Chinese Patent Application No. 202111122142.1 filed Sep. 24, 2021, the disclosure of which is incorporated herein by reference in its entirety.

FIELD OF THE DISCLOSURE

The present disclosure relates to the field of positioning technologies and, in particular, to the self-driving and artificial intelligence technologies, for example, a positioning method and apparatus, a device, a system, a medium and a self-driving vehicle, and is applicable to cloud computing.

BACKGROUND INFORMATION

The self-driving technology depends on the collaboration of artificial intelligence, visual computing, radar, a monitoring apparatus and a Global Positioning System (GPS) to enable a computer to autonomously control the driving process of a mobile terminal without human active operation.

The mobile terminal generally depends on its sensing system to sense the road environment and autonomously perform route planning and cruises, thereby providing data support for the controlling process and ensuring driving safety.

SUMMARY OF EXEMPLARY EMBODIMENTS

The present disclosure provides a positioning method and apparatus, a device, a system, a medium and a self-driving vehicle for positioning without depending on a GPS.

According to an exemplary embodiment of the present disclosure, a positioning method is provided. The method includes the steps below.

According to the current frame of point cloud data collected by a to-be-positioned terminal in a travelling environment, current key points in the current frame of point cloud data and point cloud distribution features of the current key points are determined.

According to point cloud distribution features associated with reference key points in a global positioning map and the point cloud distribution features of the current key points, target key points matching the current key points are selected from the reference key points.

According to reference pose data associated with the target key points, current pose data of the to-be-positioned terminal is determined.

According to another exemplary embodiment of the present disclosure, an electronic device is provided. The electronic device includes at least one processor and a memory communicatively connected to the at least one processor.

The memory can be configured to store instructions executable by the processor(S) to cause the at processor(s) to perform any positioning method according to the exemplary embodiments of the present disclosure.

According to another exemplary embodiment of the present disclosure, a positioning system is provided. The system includes a to-be-positioned terminal and a cloud server that are communicatively connected to each other.

The to-be-positioned terminal is configured to, according to a current frame of point cloud data collected by the to-be-positioned terminal in a travelling environment, determine current key points in the current frame of point cloud data and point cloud distribution features of the current key points and send the current key points and the point cloud distribution features of the current key points to the cloud server.

The cloud server can be configured to, according to point cloud distribution features associated with reference key points in a global positioning map and the point cloud distribution features of the current key points, select target key points matching the current key points from the reference key points.

The cloud server can be configured to, according to reference pose data associated with the target key point, determine current pose data of the to-be-positioned terminal and feed back the current pose data to the to-be-positioned terminal.

According to another exemplary embodiment of the present disclosure, a non-transitory computer-readable storage medium is provided. The storage medium is configured to store computer instructions for causing a computer to perform any positioning method according to the exemplary embodiments of the present disclosure.

According to another exemplary embodiment of the present disclosure, a self-driving vehicle is provided. The self-driving vehicle includes any electronic device according to the exemplary embodiments of the present disclosure.

With the provided technology, a to-be-positioned terminal can be accurately positioned in a travelling environment having no GPS signal or having a weak GPS signal.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the exemplary embodiments of the present disclosure.

DETAILED DESCRIPTION

Examplary embodiments of the present disclosure, including details of the exemplary embodiments of the present disclosure, are described hereinafter in conjunction with the drawings to facilitate understanding. The examplary embodiments are merely illustrative. Therefore, it will be appreciated by those having ordinary skill in the art that various changes and modifications may be made to the exemplary embodiments described herein without departing from the scope and spirit of the present disclosure. Similarly, description of well-known functions and constructions is omitted hereinafter for clarity and conciseness.

Various positioning methods and apparatuses according to the exemplary embodiments of the present disclosure are suitable for cases of positioning a to-be-positioned terminal in a travelling environment, especially for cases of positioning a to-be-positioned terminal in a travelling environment in which a weak GPS signal exists or the GPS signal is blocked. The exemplary positioning method according to the present disclosure is executable by a positioning apparatus. The positioning apparatus may be implemented by use of software and/or hardware and is specifically configured in an electronic device. The electronic device may be a to-be-positioned terminal and/or other computing devices associated with the to-be-positioned terminal, for example, a cloud server. Exemplarily, the to-be-positioned may be a vehicle or a robot, especially a self-driving vehicle.

The various positioning methods according to the present disclosure are described in detail below.

Figure 1A:
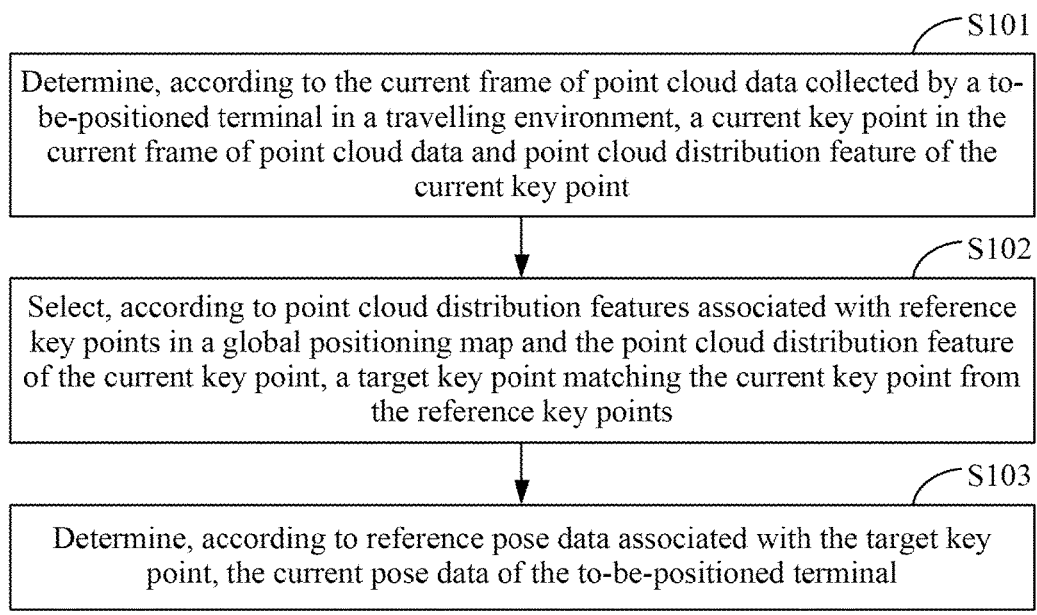
FIG. 1A is a flowchart of a positioning method according to an embodiment of the present disclosure.

Referring to FIG. 1A, a positioning method includes the steps below.

In S101, according to the current frame of point cloud data collected by a to-be-positioned terminal in a travelling environment, the current key points in the current frame of point cloud data and point cloud distribution features of the current key points are determined.

The current frame of point cloud data is used for representing one frame of point cloud data collected by the to-be-positioned at the current moment. The point cloud data may include geometric position information determined by a collection apparatus and may further include color information or reflection intensity information.

The current key point represents a sample point capable of reflecting the environment of the collection region in the current frame of point cloud. At least one current key point may be provided. Generally, multiple current key points are provided. The point cloud distribution feature is used for representing the relative position relation between a certain current key point and other collection points in the current frame of point cloud.

Optionally, the point cloud distribution feature may include a global point cloud distribution feature for representing the relative position relation between a certain key point and other key points in the point cloud frame to which the certain key point belongs.

Optionally, the point cloud distribution feature may include a local point cloud distribution feature for representing the relative position relation between a certain key point and a neighboring collection point in a neighborhood in the point cloud frame to which the certain key point belongs.

A neighboring collection point of a key point may be construed as, in the point cloud frame to which the key point belongs, another collection point in the neighborhood range in which the key point is located. The neighborhood range may be determined by a technician according to requirements or empirical values. For example, the neighborhood range may be a geometric region (such as a circular region) having a key point as the center and a preset length as the radius. The preset length may be determined according to requirements or a number of experiments. For example, the preset length may be 2 meters.

It is to be understood that the point cloud distribution feature is refined to distribution feature data representing different relative position relations so that the richness of the point cloud distribution feature can be increased, helping improve the effectiveness and accuracy of the target key points matched by the current key points and the accuracy of determination results of the current pose data.

In S102, according to point cloud distribution features associated with reference key points in a global positioning map and the point cloud distribution feature of the current key point, a target key point matching the current key point is selected from the reference key points.

The global positioning map may be construed as an environmental map constructed based on at least one reference frame of point cloud data collected in advance in the travelling environment of the to-be-positioned terminal. For each reference frame of point cloud data, according to the each reference frame of point cloud data, the reference key points and the point cloud distribution features associated with the reference key points are determined.

Exemplarily, the point cloud distribution feature of the current key point is matched with the point cloud distribution features associated with the reference key points in the global positioning map, and then the target key point matching the current key points is selected from the reference key points according to a matching result.

In S103, according to reference pose data associated with the target key point, the current pose data of the to-be-positioned terminal is determined.

The reference pose data is used for representing the pose data in the collection process corresponding to the reference frame of point cloud to which the target key point belongs.

It is to be understood that the target key point matching the current key point is determined from the global positioning map so that the reference pose data corresponding to the reference frame of point cloud to which the target key point belongs in the global positioning map can serve as the determination basis of the current pose data of the to-be-positioned terminal.

Exemplarily, the reference pose data associated with the target key points may directly serve as the current pose data of the to-be-positioned terminal.

It is to be noted that the current key point is possibly unable to be completely consistent with the target key point, that is, there exists a certain matching deviation between the current key point and the target key point. Thus, the deviation between the current key point and the target key point may be also determined. According to the deviation, the reference pose data associated with the target key point is adjusted; and according to the adjusted result, the current pose data of the to-be-positioned terminal is determined.

Figure 1B:
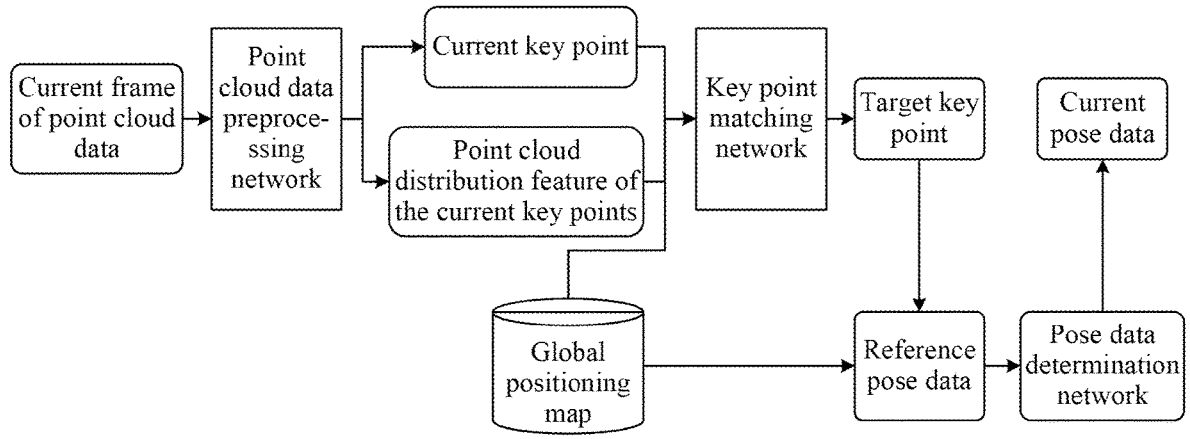
FIG. 1B is a diagram illustrating the structure of a positioning network according to an embodiment of the present disclosure.

In one optional embodiment, the preceding positioning method may be implemented based on a machine learning model or a deep learning model in artificial intelligence. Referring to FIG. 1B, a positioning network includes a point cloud data preprocessing network, a key point matching network and a pose data determination network. The point cloud data preprocessing network is used for determining the current key points in the current frame of point cloud data and the point cloud distribution features of the current key points according to the current frame of point cloud data collected by the to-be-positioned terminal in the travelling environment. The key point matching network is used for selecting the target key point matching the current key point from the reference key points according to the point cloud distribution features associated with the reference key points in the global positioning map and the point cloud distribution features of the current key points. The pose data determination network is used for determining the current pose data of the to-be-positioned terminal according to the reference pose data associated with the target key point. The preceding point cloud data preprocessing network, key point matching network and pose data determination network may be each obtained based on a combination of at least one machine learning model or at least one deep learning model as long as the preceding networks can be ensured to implement their corresponding functions. The specific structures of the preceding networks are not limited in the present disclosure.

In this exemplary embodiment of the present disclosure, the target key point matching the current key point is searched in the global positioning map through introduction of the point cloud distribution feature of the current key point in the current frame of point cloud data of the to-be-positioned terminal. In this manner, according to the reference pose data associated with the target key point, the pose data of the to-be-positioned terminal can be determined so that the terminal can be still positioned without relying on GPS data when the GPS is blocked or a GPS signal is weak, thereby improving the universality of the positioning method.

It is to be noted that the to-be-positioned terminal or other computing devices associated with the to-be-positioned can implement the positioning method of this embodiment of the present disclosure so as to reduce the requirements on the computing capability of the to-be-positioned terminal. In one optional exemplary embodiment, the current pose data may be also determined through interaction between the to-be-positioned terminal and at least one another computing device to achieve the balanced distribution of computing resources.

Figure 1C:
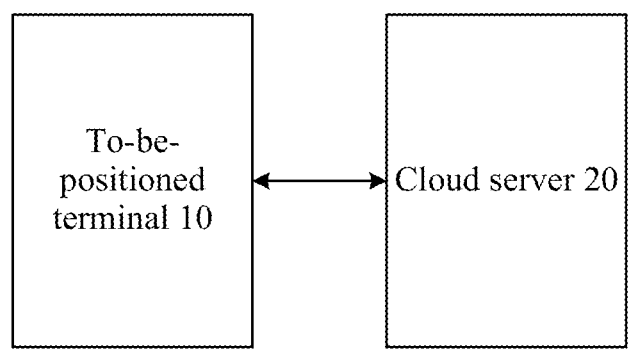
FIG. 1C is a diagram illustrating the structure of a positioning system according to an embodiment of the present disclosure.

Referring to FIG. 1C, a positioning system includes a to-be-positioned terminal 10 and a cloud server 20 that are communicatively connected to each other. The specific communicative mode and/or communicative network are not limited in the present disclosure.

The to-be-positioned terminal 10 is configured to collect the current frame of point cloud data in its travelling environment, determine the terminal data according to the current frame of point cloud data, where the terminal data includes the current key points in the current frame of point cloud data and the point cloud distribution feature of the current key point, and send the terminal data to the cloud server 20.

The cloud server 20 is configured to select the target key point matching the current key point from the reference key points according to the point cloud distribution features associated with the reference key points in the global positioning map and the point cloud distribution feature of the current key point; determine the current pose data of the to-be-positioned terminal according to the reference pose data associated with the target key point; and feed back the current pose data to the to-be-positioned terminal 10. The determination operation of the current pose data may be referred to the description of other embodiments of the present disclosure and is not repeated here.

Figure 1D:
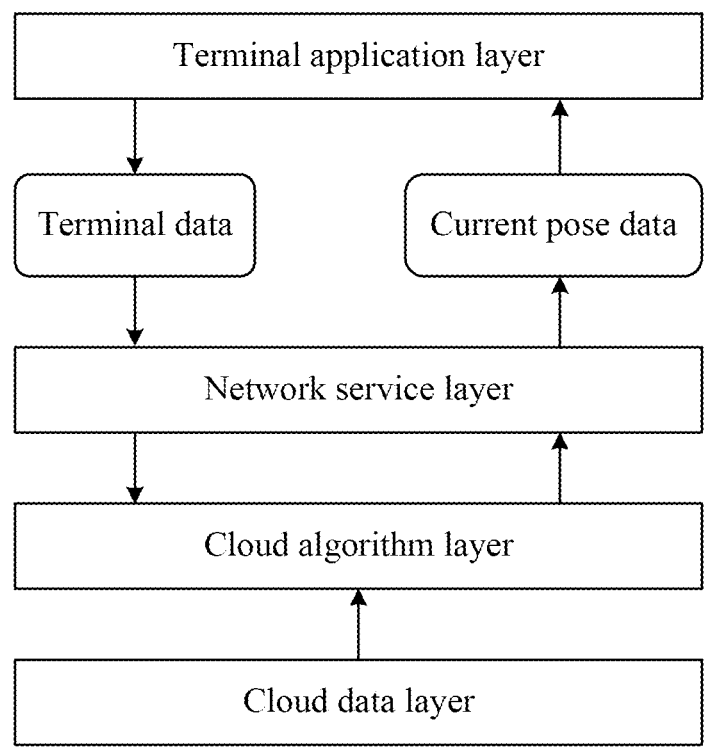
FIG. 1D is a diagram illustrating the architecture of a positioning system according to an embodiment of the present disclosure.

Specifically, reference is made to the architecture diagram of a positioning system as shown in FIG. 1D. The to-be-positioned terminal is provided with a terminal application layer. The cloud server is provided with a cloud algorithm layer and a cloud data layer. A network service layer is provided between the to-be-positioned terminal and the cloud server for data transmission. The terminal application layer is used for determining the terminal data according to the current frame of point cloud data collected by the to-be-positioned terminal and transmitting the terminal data to the cloud algorithm layer through the network service layer. The cloud data layer is used for storing the reference key point corresponding to each reference frame of point cloud in the global positioning map and the point cloud distribution features associated with the reference key points and providing data support for determining the current pose data. The cloud algorithm layer is used for determining the current pose data according to the data provided by the cloud data layer and the terminal data sent by a vehicle terminal application layer disposed by the to-be-positioned terminal, transmitting the current pose data to the terminal application layer of the to-be-positioned terminal through the network service layer and completing the current frame of point cloud data-based positioning process.

It is to be understood that the to-be-positioned terminal preprocesses the current frame of point cloud data to obtain the terminal data including the current key points and the point cloud distribution features of the current key points, and sends the terminal data to the cloud server for determining the current pose data. The to-be-positioned terminal only transmits the terminal data to the cloud server so that the waste of bandwidth resources caused by transmission of irrelevant data in the current frame of point cloud data can be reduced. Moreover, the determination process of the current pose data is implemented in the cloud server so that the data computation of the to-be-positioned terminal can be reduced, and the requirements on the data processing capability of the to-be-positioned terminal can be lowered, thereby reducing the hardware cost input of the to-be-positioned terminal. Additionally, the current pose data is determined by the cloud server, so the to-be-positioned terminal does not need to determine the global positioning map, the reference key point corresponding to each reference frame of point cloud data associated with the global positioning map and the point cloud distribution features associated with the reference key point, thereby reducing the requirements on the data storage capability of the to-be-positioned terminal.

Based on the preceding technical solutions, the present disclosure further provides one optional embodiment in which the selection of the target key point is optimized and improved. For a part not described in this embodiment, reference may be made to the description of the preceding embodiment. This is not repeated here.

Figure 2A:
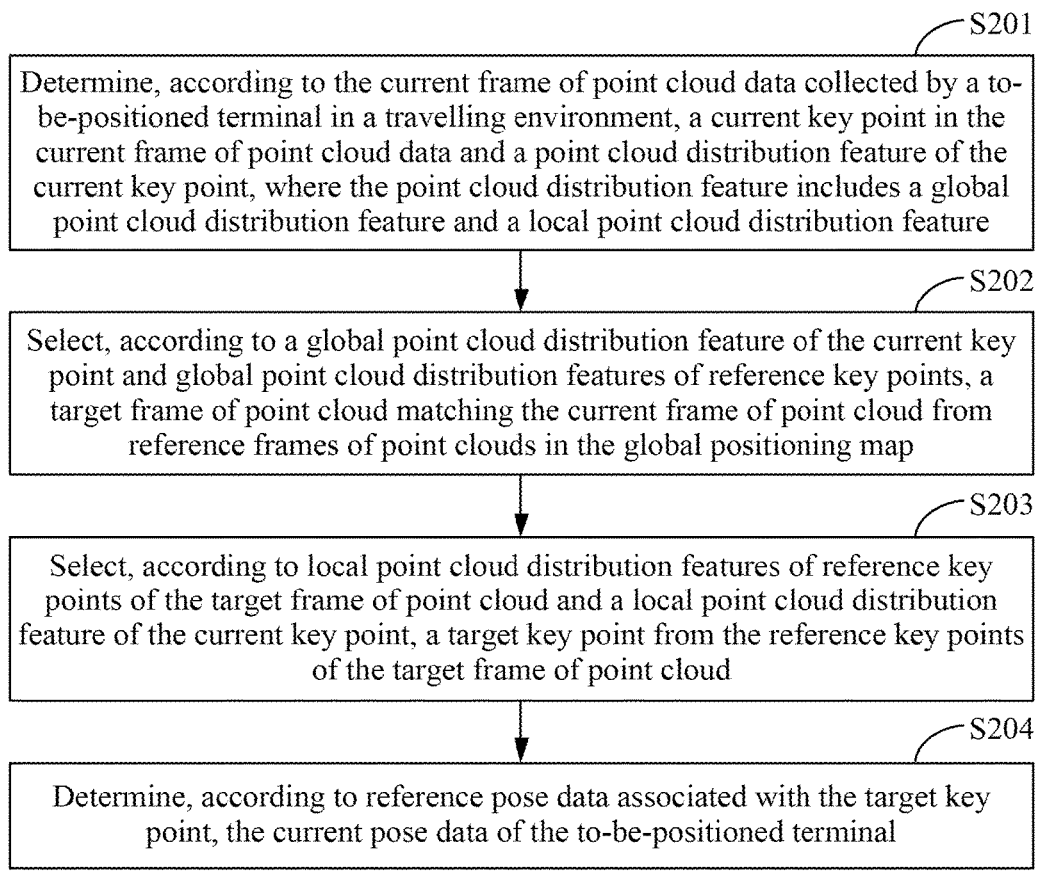
FIG. 2A is a flowchart of another positioning method according to an embodiment of the present disclosure.

Referring to FIG. 2A, a positioning method includes the steps below.

In S201, according to the current frame of point cloud data collected by a to-be-positioned terminal in a travelling environment, the current key point in the current frame of point cloud data and a point cloud distribution feature of the current key point are determined, where the point cloud distribution feature includes a global point cloud distribution feature and a local point cloud distribution feature.

Exemplarily, key points are extracted from the current frame of point cloud data to obtain the current key points, and the global point cloud distribution feature and the local point cloud distribution feature are determined according to the current frame of point cloud data and according to the point cloud data of the current key points.

Figure 2B:
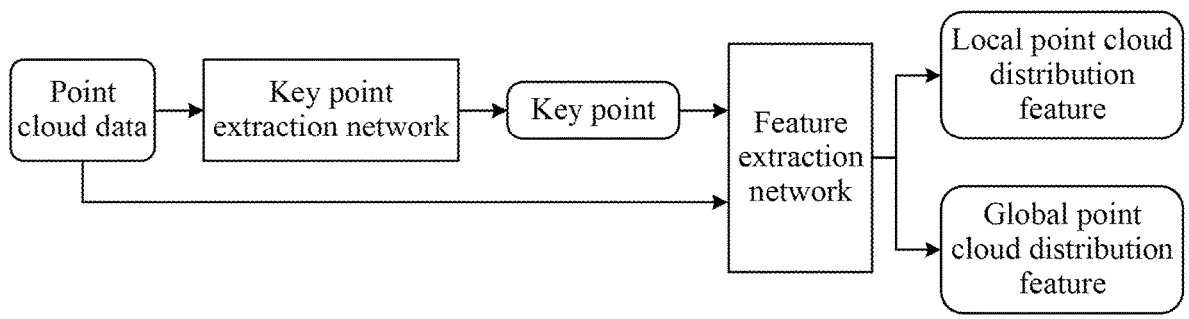
FIG. 2B is a diagram illustrating the structure of a point cloud data preprocessing network according to an embodiment of the present disclosure.

Specifically, reference is made to a diagram illustrating the structure of a point cloud data preprocessing network as shown in FIG. 2B. The point cloud data preprocessing network includes a key point extraction network and a feature extraction network. The key point extraction network is used for extracting key points from the current frame of point cloud data to obtain the current key points. The feature extraction network is used for extracting descriptive features from the current frame of point cloud data and the point cloud data of the current key points to obtain the global point cloud distribution feature and the local point cloud distribution feature.

In one optional embodiment, the current frame of point cloud data may be input into the key point extraction network, and the current key points may be selected from the current frame of point cloud. The key point extraction network may be implemented based on a machine learning model. The network structure and the specific number of the machine learning model involved are not limited in the present disclosure.

In one optional embodiment, the global point cloud distribution feature of the current key point is determined according to the relative position relation between different current key points in the current frame of point cloud data. The local point cloud distribution feature of the current key point is determined according to the relative position relation between neighboring collection points in the neighborhood to which the each current key point belongs. The global point cloud distribution feature corresponds to the current frame of point cloud data. The local point cloud distribution feature corresponds to the current key point in the current frame of point cloud data. That is, there are one group of global point cloud distribution features for the current frame of point cloud data, and there are one group of local point cloud distribution features for the each current key point in the current frame of point cloud.

It is to be understood that the current key points are extracted from the current frame of point cloud so that the shape expressed by the current frame of point cloud can be described and summarized by relatively sparse current key points. In this manner, the subsequent data computation can be reduced, the computation can be prevented from being increased by ineffective collection points, the subsequent target key point matching process can be prevented from being interfered by abnormal collection points, and the accuracy of determination results of the target key points canmay be increased. With the relative position relation between different current key points in the current frame of point cloud data, the global point cloud distribution feature is determined, and the point cloud distribution of the different current key points in the current point cloud data can be obtained so that the position information of the current key points can be described from the global perspective of the current frame of point cloud. With the relative position relation between each current key point in the current frame of point cloud data and the neighboring collection points in the neighborhood, the local point cloud distribution feature is determined, and the point cloud distribution between the each current key point and the neighboring collection points in the neighborhood can be obtained so that the position information of the each current key point can be described within the local range of the each current key point in the current frame of point cloud.

It is to be noted that FIG. 2B is also suitable for extraction of the reference key points of the reference frames of point clouds in the global positioning map and for the determination process of the local point cloud distribution feature and the global point cloud distribution features of the reference key points according to the reference frame of point cloud data, as long as the reference point clouds are used instead of the current frame of point cloud, the reference frame of point cloud data is used instead of the current frame of point cloud data, and the reference key points are used instead of the current key points.

The extraction of the reference key points of the reference frames of point clouds in the global positioning map and the determination of the point cloud distribution features of the reference key points are implemented in the manners not limited to the manner of FIG. 2B.

For ease of calculation, the reference key points of each reference frame of point cloud data in the global positioning map, the global point cloud distribution features of the reference key points and the local point cloud distribution features of the reference key points may be prestored and may be searched and used in real-time positioning.

Figure 2C:
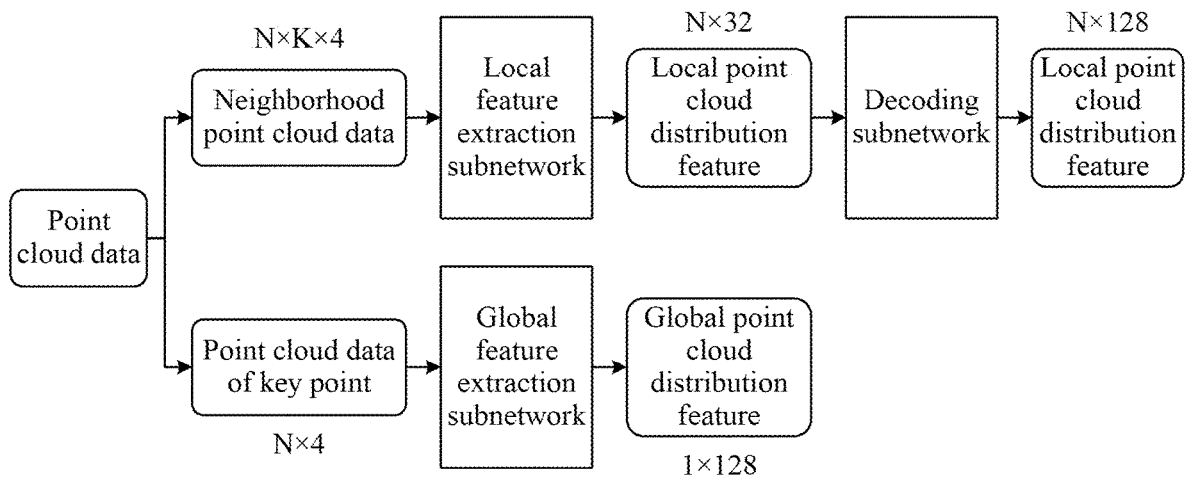
FIG. 2C is a diagram illustrating the structure of a feature extraction network according to an embodiment of the present disclosure.

Reference is made to a diagram illustrating the structure of a feature extraction network as shown in FIG. 2C. The feature extraction network includes a local feature extraction subnetwork and a global feature extraction subnetwork. The local feature extraction subnetwork and the global feature extraction subnetwork may be each implemented by use of a neural network model and may have the same network structure or different network structures. The specific network structures of the two subnetworks are not limited in the present disclosure.

In one specific implementation, the point cloud data (N×4, where N is the number of the current key points) of key points in the point cloud data is input into the global feature extraction subnetwork, and the global point cloud distribution feature (1×28) of the key points is determined according to the relative position relation between different key points in the point cloud frame. The global feature extraction subnetwork may be implemented by use of a PointNet module.

In one specific implementation, the neighboring collection points of each key point are determined according to the point cloud data, so the neighborhood point cloud data (N×K×4, where K is the number of the neighboring collection points) corresponding to the each key point is determined; the neighborhood point cloud data is input into the local feature extraction subnetwork; and the local point cloud distribution feature (N×32) of the each key point is determined according to the relative position relation between the neighboring collection points in the neighborhood to which the each key point belongs. The local feature extraction subnetwork may be implemented by use of a PointNet module.

In one optional implementation, the feature extraction network may further include a decoding subnetwork for performing the raising dimension processing on the local point cloud distribution feature to update the local point cloud distribution feature (N×128).

It is to be noted that the feature dimension of each point cloud distribution feature (for example, 32 and 128) and the number K of the neighboring collection points may be adjusted by technical staff according to requirements and a number of experiments and should not be construed as limiting the content of the present disclosure.

It is to be noted that the feature extraction network as shown in FIG. 2C may be used for processing the current frame of point cloud data, and the corresponding preceding key points are the current key points in the current frame of point cloud so that the global point cloud distribution feature and the local point cloud distribution features of the current key points are obtained. Certainly, the feature extraction network as shown in FIG. 2C may be also used for processing the reference frame of point cloud data of each reference frame of point cloud in the global positioning map, and the corresponding preceding key points are the reference key points in the reference frames of point clouds so that the global point cloud distribution features and the local point cloud distribution features of the reference key points are obtained. Different frames of point cloud data may have the same number of the key points or different numbers of the key points. For ease of calculation, the number of the current key points of the current frame of point cloud data is generally the same as the number of the reference key points of each reference frame of point cloud data.

The extraction of the reference key points of the global positioning map and the determination of the point cloud distribution features of the reference key points may be determined independently before the positioning method is performed, and the determination results are prestored for use, so as to reduce the data computation in the real-time positioning process.

In S202, according to a global point cloud distribution feature of the current key point and global point cloud distribution features of reference key points, a target frame of point cloud matching the current frame of point cloud is selected from reference frames of point clouds in the global positioning map.

In S203, according to local point cloud distribution features of reference key points of the target frame of point cloud and a local point cloud distribution feature of the current key point, a target key point is selected from the reference key points of the target frame of point cloud.

Exemplarily, the reference frames of point clouds in the global positioning map are preliminarily screened by the global point cloud distribution feature to obtain the target frame of point cloud matching the current frame of point cloud. The matching range of the current key point is narrowed down from all the reference key points in the global positioning map to the reference key points in the target frame of point cloud through determination of the target frame of point cloud so that the data computation in the target key point matching process may be reduced, thereby increasing the matching efficiency of the target key point and helping improve the accuracy of matching results of the target key point.

Figure 2D:
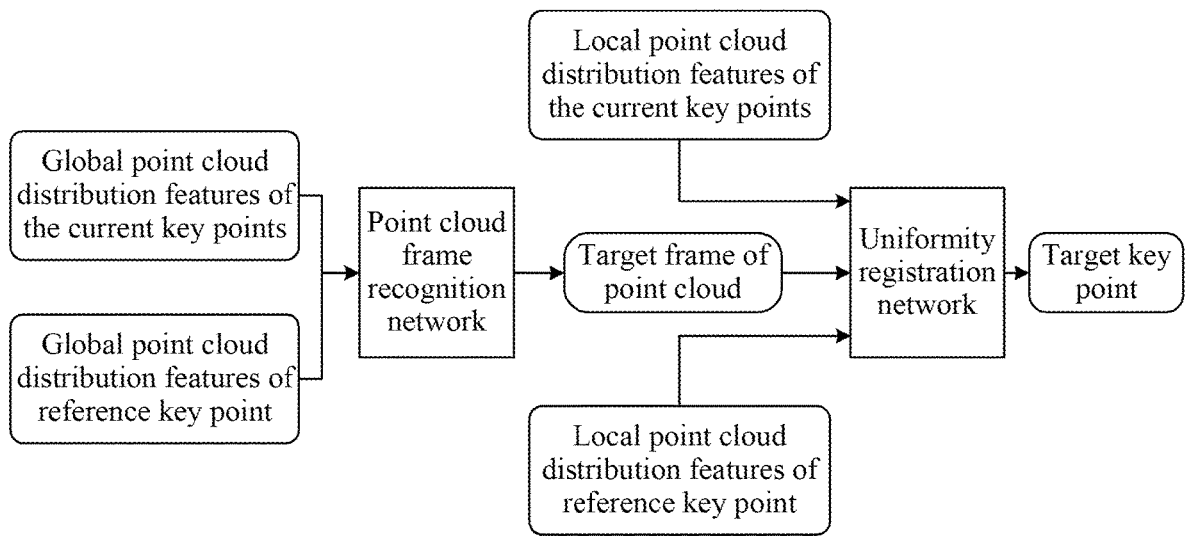
FIG. 2D is a diagram illustrating the structure of a key point matching network according to an embodiment of the present disclosure.

Specifically, reference is made to a diagram illustrating the structure of a key point matching network as shown in FIG. 2D. The key point matching network may include a point cloud frame recognition network and a uniformity registration network. The point cloud frame recognition network is used for recognizing the target frame of point cloud matching the current frame of point cloud from the reference frames of point clouds in the global positioning map according to the global point cloud distribution feature so as to narrow down the registration range of the current key point. The uniformity registration network is used for selecting the target key point having better uniformity with the current key point from the reference key points in the target frame of point cloud according to the local point cloud distribution feature. The point cloud frame recognition network and the uniformity registration network may be each implemented by use of a machine learning model or a deep learning model. The specific network structures of the point cloud frame recognition network and the uniformity registration network are not limited in the present disclosure.

In one exemplary implementation, the global point cloud distribution features of the current frame of point cloud and the global point cloud distribution features of the reference frames of point clouds in the global positioning map are directly input into the point cloud frame recognition network to obtain at least one reference frame of point cloud matching the current frame of point cloud as the target frame of point cloud.

In one exemplary implementation, the local point cloud distribution features of the reference key points in the target frame of point cloud and the local point cloud distribution features of the current key points in the current frame of point cloud are input into the uniformity registration network to obtain the target key point matching the current key point in the reference key points of the reference frames of point clouds.

Based on the preceding exemplary technical solutions, the feature dimension of the input data of the key point matching network may be further enriched to improve the accuracy of matching results of the target frame of point cloud and the accuracy of matching results of the target key point.

Exemplarily, according to the point cloud data of key points, the inter-key point distribution feature of each of the key points in a respective point cloud frame is determined, where the key points include the current key points and the reference key points. According to the inter-key point distribution feature and the global point cloud distribution feature, fusion global point cloud distribution features of the key points are determined.

The inter-key point distribution feature of a certain exemplary key point is used for representing the relative position relation between the certain key point and other key points in the point cloud frame to which the certain key point belongs. It is to be understood that each key point has a corresponding inter-key point distribution feature, so the inter-key point distribution feature corresponding to the point cloud frame to which the each key point belongs carries richer feature information than the global point cloud distribution feature, helping improve the accuracy of determination results of the target frame of point cloud.

Specifically, for the current key points in the current frame of point cloud data, the inter-key point distribution feature of each current key point in the current frame of point cloud is determined according to the point cloud data of the current key points. The fusion global point cloud distribution feature of the current key point is determined according to the inter-key point distribution feature of the each current key point and the global point cloud distribution feature of the current key point. The fusion global point cloud distribution feature of the current key point is determined according to the inter-key point distribution feature of the current key point and the global point cloud distribution feature of the current key point. For reference key points in the reference frame of point cloud data, the inter-key point distribution feature of each reference key point in the reference frame of point cloud is determined according to the point cloud data of the reference key point. The fusion global point cloud distribution feature of the reference key point is determined according to the inter-key point distribution feature of the reference key point and the global point cloud distribution feature of the reference key point. The fusion global point cloud distribution feature of the reference key point is determined according to the inter-key point distribution feature of the reference key point and the global point cloud distribution feature of the reference key point.

Accordingly, according to the fusion global point cloud distribution features of the current key points and the fusion global point cloud distribution features of the reference key points, the target frame of point cloud matching the current frame of point cloud is selected from the reference frames of point clouds in the global positioning map.

It is to be understood that the fusion global point cloud distribution feature is used instead of the global point cloud distribution feature for selecting the target frame of point cloud due to the richer feature information carried by the fusion global point cloud distribution feature so that the accuracy of selection results can be increased, and the matching range can be narrowed when the current key point is matched with the target key point, thereby helping improve the determination efficiency of the target key point and the accuracy of the determination results of the target key point.

Exemplarily, according to the point cloud data of key points, the inter-key point distribution feature of the key points in respective point cloud frames is determined, where the key points include the current key points and the reference key points. According to the inter-key point distribution feature and the local point cloud distribution feature, the fusion local point cloud distribution features of the key points are determined.

The inter-key point distribution feature of a certain key point is used for representing the relative position relation between the certain key point and other key points in the point cloud frame to which the certain key point belongs. The local point cloud distribution features of a key point carries the relative position relation between the key point and the neighboring collection points. Therefore, the local point cloud distribution features of the key point and the inter-key point distribution feature of the key point are fused so that the relative position relation between the key point and other collection points in the point cloud frame to which the key point belongs can be enriched, thereby helping improve the accuracy of determination results of the target key points.

Specifically, for the current key points in the current frame of point cloud data, the inter-key point distribution feature of each current key point in the current frame of point cloud is determined according to the point cloud data of the current key point. The fusion local point cloud distribution feature of the current key point is determined according to the inter-key point distribution feature of the current key point and the local point cloud distribution feature of the current key point. The fusion local point cloud distribution feature of the current key point is determined according to the inter-key point distribution feature of the current key point and the local point cloud distribution feature of the current key point. For reference key points in the reference frame of point cloud data, the inter-key point distribution feature of the each reference key point in the reference frame of point cloud is determined according to the point cloud data of the reference key point. The fusion local point cloud distribution feature of the reference key point is determined according to the inter-key point distribution feature of the reference key point and the local point cloud distribution feature of the reference key point. The fusion local point cloud distribution feature of the reference key point is determined according to the inter-key point distribution feature of the reference key point and the local point cloud distribution feature of the reference key point.

Accordingly, according to the fusion global point cloud distribution features of the reference key points of the target frame of point cloud and the fusion local point cloud distribution features of the current key points, the target key points is selected from the reference key points of the target frame of point cloud.

It is to be understood that the fusion local point cloud distribution feature is used instead of the local point cloud distribution feature for selecting the target key points due to the richer feature information carried by the fusion local point cloud distribution feature so that the accuracy of the selected target key point can be increased, thereby helping improve the accuracy of determination results of the current pose data.

Figure 2E:
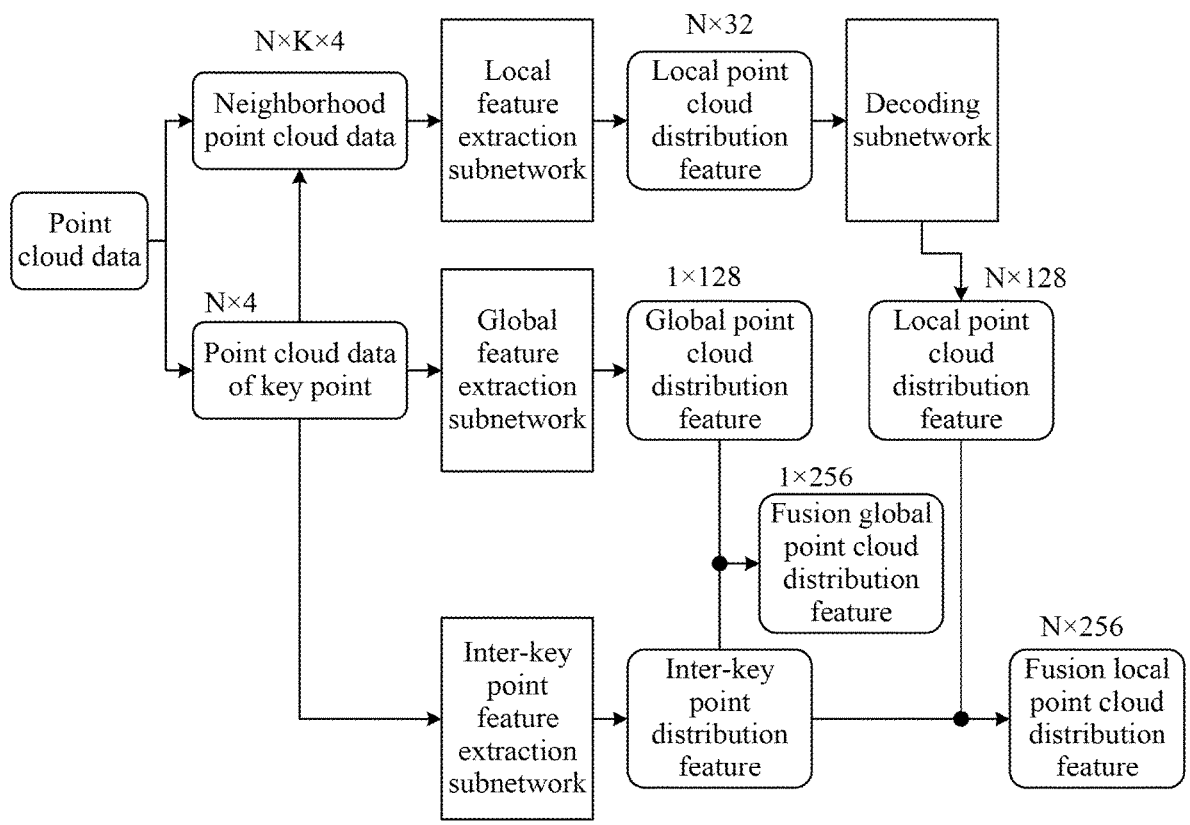
FIG. 2E is a diagram illustrating the structure of another feature extraction network according to an embodiment of the present disclosure.

Reference is made to a diagram illustrating the structure of a feature extraction network as shown in FIG. 2E. Based on the feature extraction network as shown in FIG. 2C, the feature extraction network is added with an inter-key point feature extraction subnetwork for determining the inter-key point distribution feature based on the point cloud data of the key points. The network structure of the inter-key point feature extraction subnetwork may be implemented based on a machine learning model or a deep learning model and is not limited in the present disclosure.

In one specific implementation, the point cloud data (N×4) of the key points in the point cloud data is input into the inter-key point feature extraction subnetwork, and the distribution feature of each key point and other key points is determined according to the relative position relation between different key points to obtain the inter-key point distribution feature (N×128). The inter-key point feature extraction subnetwork may be implemented based on a neural network.

For the local point cloud distribution feature (N×128), the local point cloud distribution feature and the inter-key point distribution feature (N×128) may be directly spliced and fused to obtain the fusion local point cloud distribution feature (N×256). For the global point cloud distribution feature (1×128) and the inter-key point distribution feature (N×128), the inter-key point distribution feature (N×128) may be pooled first to obtain a pooling result (1×128), and then the pooling result (1×128) and the global point cloud distribution feature (1×128) are spliced and fused to obtain the fusion global point cloud distribution feature (1×256). The pooling function used in the pooling process is not limited in the present disclosure. For example, the maximum pooling may be used.

It is to be noted that the feature extraction network as shown in FIG. 2E may be used for processing the current frame of point cloud data, and the corresponding preceding key point is the current key points in the current frame of point cloud so that the fusion global point cloud distribution features of the current key points and the fusion local point cloud distribution features of the current key points are obtained. Certainly, the feature extraction network of FIG. 2E may be also used for processing the reference frame of point cloud data of each reference frame of point cloud in the global positioning map, and the corresponding preceding key points are the reference key points in the each reference frame of point cloud so that the fusion global point cloud distribution features of the reference key points and the fusion local point cloud distribution features of the reference key points are obtained. Different frames of point cloud data may have the same number of key points or a different number of key points. For ease of computation, the number of current key points in the current frame of point cloud data is generally the same as the number of reference key points in each reference frame of point cloud data.

In S204, according to reference pose data associated with the target key points, the current pose data of the to-be-positioned terminal is determined.

In this embodiment of the present disclosure, the selection of the target frame of point cloud narrows down the matching range of the current key points from all the reference key points in the global positioning map to the reference key points in the target frame of point cloud so that the data computation in the target key points matching process can be reduced, thereby improving the matching efficiency of the target key points and helping improve the accuracy of matching results of the target key points.

Based on the preceding technical solutions, the present disclosure further provides one optional embodiment in which the selection of the target frame of point cloud is optimized and improved. For a part not described in this embodiment, reference may be made to the preceding embodiment. This is not repeated here.

Figure 3A:
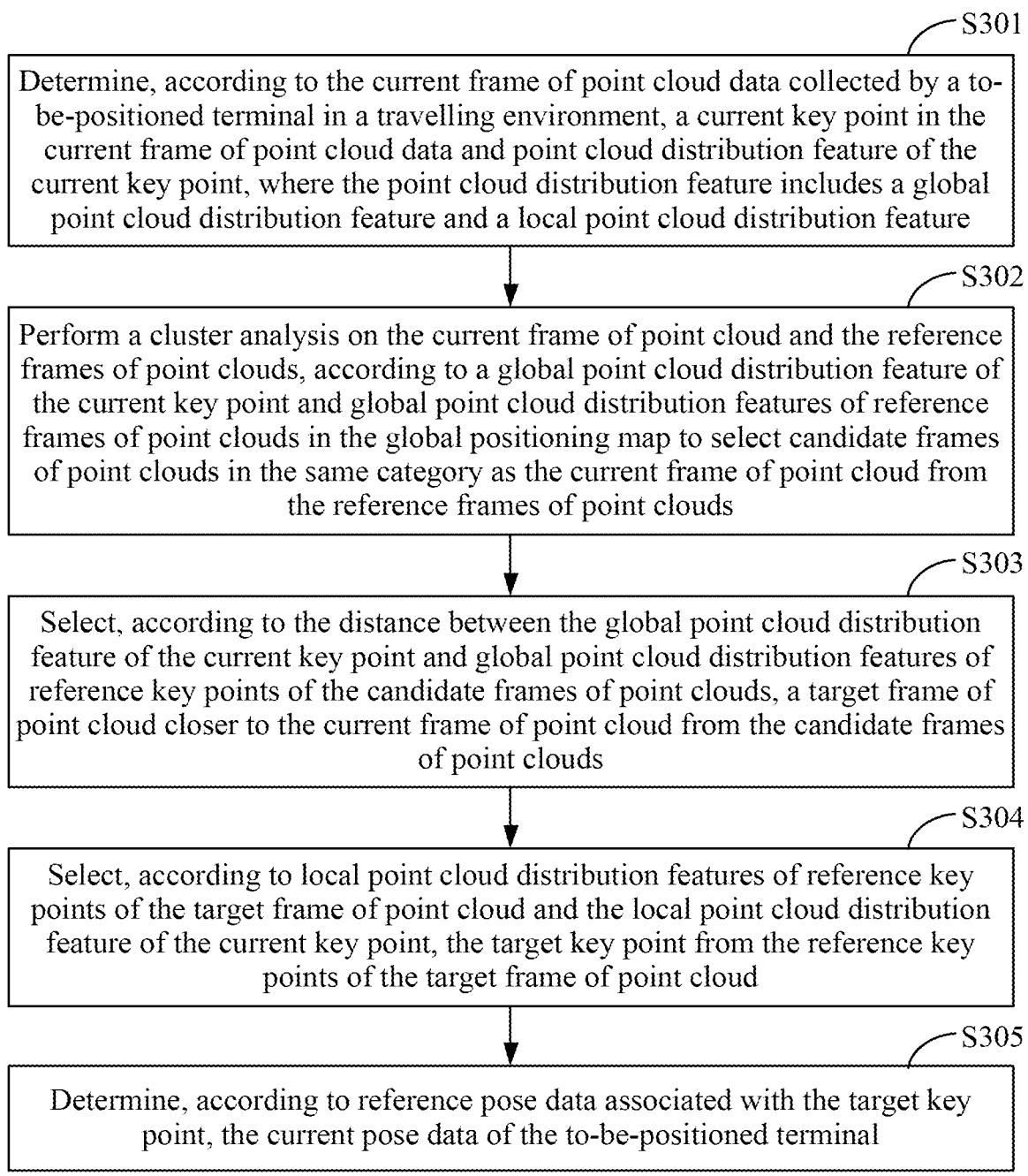
FIG. 3A is a flowchart of another positioning method according to an embodiment of the present disclosure.

Referring to FIG. 3A, a positioning method includes the steps below.

In S301, according to the current frame of point cloud data collected by a to-be-positioned terminal in a travelling environment, the current key point in the current frame of point cloud data and a point cloud distribution feature of the current key point are determined, where the point cloud distribution feature includes a global point cloud distribution feature and a local point cloud distribution feature.

In S302, according to a global point cloud distribution feature of the current key point and global point cloud distribution features of reference frames of point clouds in the global positioning map, a cluster analysis on the current frame of point cloud and the reference frames of point clouds is performed to select candidate frames of point clouds in the same category as the current frame of point cloud from the reference frames of point clouds.

In S303, according to the distance between the global point cloud distribution feature of the current key point and global point cloud distribution features of reference key points of the candidate frames of point clouds, a target frame of point cloud closer to the current frame of point cloud is selected from the candidate frames of point clouds.

The reference frames of point clouds are secondarily screened by the global point cloud distribution feature of the current key point and the global point cloud distribution features of the reference frames of point clouds so that the number of target frames of point clouds can be reduced, and the matching range can be narrowed down when the current key point is matched with the target key point, thereby reducing the data computation in the target key point matching process.

Figure 3B:
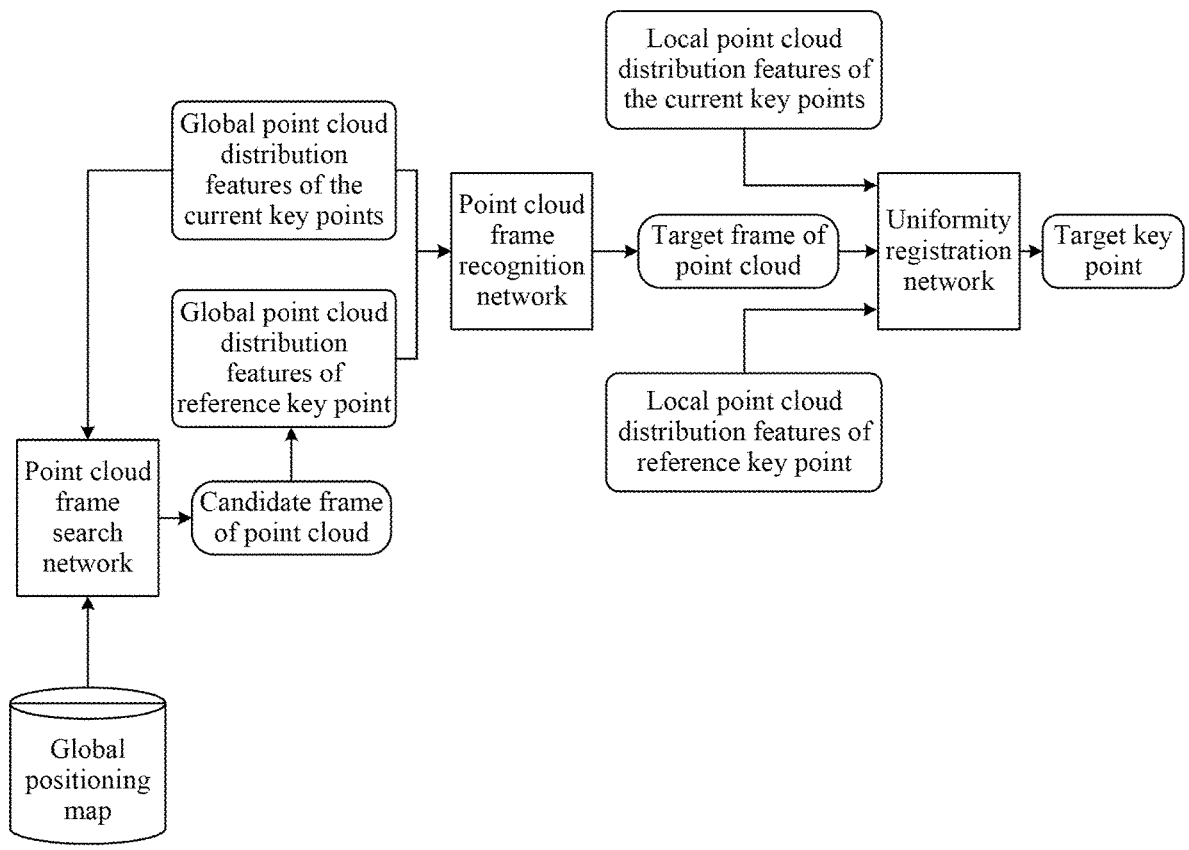
FIG. 3B is a diagram illustrating the structure of another key point matching network according to an embodiment of the present disclosure.

In one optional embodiment, reference is made to a key point matching network as shown in FIG. 3B. Based on the network structure as shown in FIG. 2D, the key point matching network is added with a point cloud frame search network for performing the cluster analysis on the current frame of point cloud and the reference frames of point clouds according to the global point cloud distribution feature of the current frame of point cloud and the global point cloud distribution features of the reference frames of point clouds so as to select the candidate frames of point clouds in the same category as the current frame of point cloud from the reference frames of point clouds. The same category may be construed as the cluster results in the same category and/or the cluster results in similar categories. Exemplarily, the point cloud frame search network may be based on a k-nearest neighbors (k-NN) algorithm. This is not limited in the present disclosure.

Accordingly, the point cloud frame recognition network is used for selecting the target frame of point cloud closer (for example, closest) to the current frame of point cloud from the candidate frames of point clouds according to the global point cloud distribution feature of the current keypoint and the global point cloud distribution features of the reference key points of the candidate frames of point clouds. The distance may be Euclidean distance or other distance and is not limited in the present disclosure.

In S304, according to local point cloud distribution features of reference key points of the target frame of point cloud and the local point cloud distribution feature of the current key point, the target key point is selected from the reference key points of the target frame of point cloud.

In S305, according to reference pose data associated with the target key point, the current pose data of the to-be-positioned terminal is determined.

In this embodiment of the present disclosure, the candidate frames of point clouds in the same category as the current frame of point cloud are selected from the reference frames of point clouds through the cluster analysis so that the candidate frames of point clouds can be preliminarily screened from the massive reference frames of point clouds in the global positioning map, reducing the data computation in the target frame of point cloud determination process. The target frame of point cloud is selected from the candidate frames of point clouds through the distance between the global point cloud distribution features so that the accuracy of determination results of the target frame of point cloud can be increased, and the selection range of the target key point can be narrowed down, helping improve the determination efficiency of the target key point.

Based on the preceding technical solutions, the present disclosure further provides one optional embodiment in which the determination of the current pose data is optimized and improved.

Figure 4A:
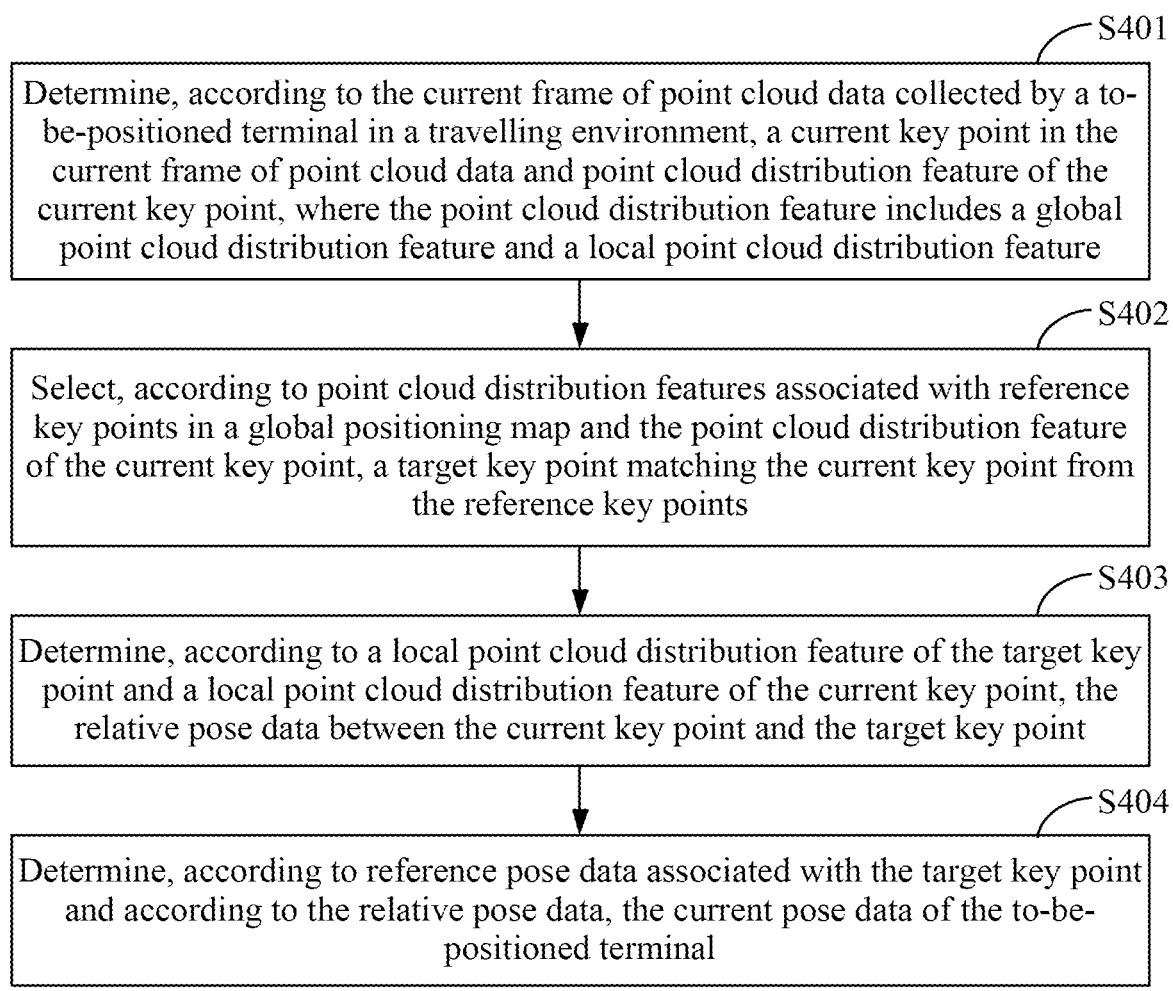
FIG. 4A is a flowchart of another positioning method according to an embodiment of the present disclosure.

Referring to FIG. 4A, a positioning method includes the steps below.

In S401, according to the current frame of point cloud data collected by a to-be-positioned terminal in a travelling environment, the current key point in the current frame of point cloud data and a point cloud distribution feature of the current key point are determined, where the point cloud distribution feature includes a global point cloud distribution feature and a local point cloud distribution feature.

In S402, according to point cloud distribution features associated with reference key points in a global positioning map and the point cloud distribution feature of the current key point, a target key point matching the current key point is selected from the reference key points.

In S403, according to a local point cloud distribution feature of the target key point and a local point cloud distribution feature of the current key point, the relative pose data between the current key point and the target key point is determined.

In S404, according to reference pose data associated with the target key point and according to the relative pose data, the current pose data of the to-be-positioned terminal is determined.

The relative pose data is used for representing the relative position relation between the current key point and the target key point. The reference pose data is position coordinates of the predetermined target key point in the world coordinate system. The determination manner of the reference pose data is not limited in the present disclosure.

The collection terminal of the current key points may be different from the collection terminal of the target key points, so the coordinate systems used by the point cloud data of the current key points and the target key points are also different. Accordingly, the point cloud data of the current key points may be transformed into the coordinate system of the target key points through the relative pose data. The reference pose data is adjusted according to the position differences between the transformed current key point and the target key points to obtain the current pose data.

In one optional implementation, the random sample consensus (RANSAC) may be used for determining the relative pose data between the current key point and the target key point according to the local point cloud distribution feature of the target key point and the local point cloud distribution feature of the current key point.

When the current key point is matched with the target key point, a matching offset may partially exist, affecting the accuracy of determination results of the relative pose data. To further optimize the determination process of the relative pose data, the operation of determining the relative pose data between the current key point and the target key point according to the local point cloud distribution features of the target key point and the local point cloud distribution features of the current key point may be refined into the following: For each current key point, the spatial offset data between the each current key point and a corresponding target key point is determined according to the local point cloud distribution features of the each current key point and the local point cloud distribution features of the corresponding target key point; the spatial position of the each current key point is corrected according to the spatial offset data; and the relative pose data is determined according to the point cloud data of the each corrected current key point and the point cloud data of the corresponding target key point.

The spatial offset data is used for representing the position offset between the current key point and the target key point.

Due to different collection accuracy, different collection environments and different systematic errors of different collection terminals, an inconsistent transformation occurs when key points collected by different collection terminals move to coordinate systems corresponding to other collection terminals. Therefore, the spatial position of the current key point is corrected by introduction of the spatial offset data so that the influence caused by differences between different collection terminals can be eliminated, helping improve the coordinate transformation accuracy of the current key points and a collection terminal corresponding to the target key points.

Figure 4B:
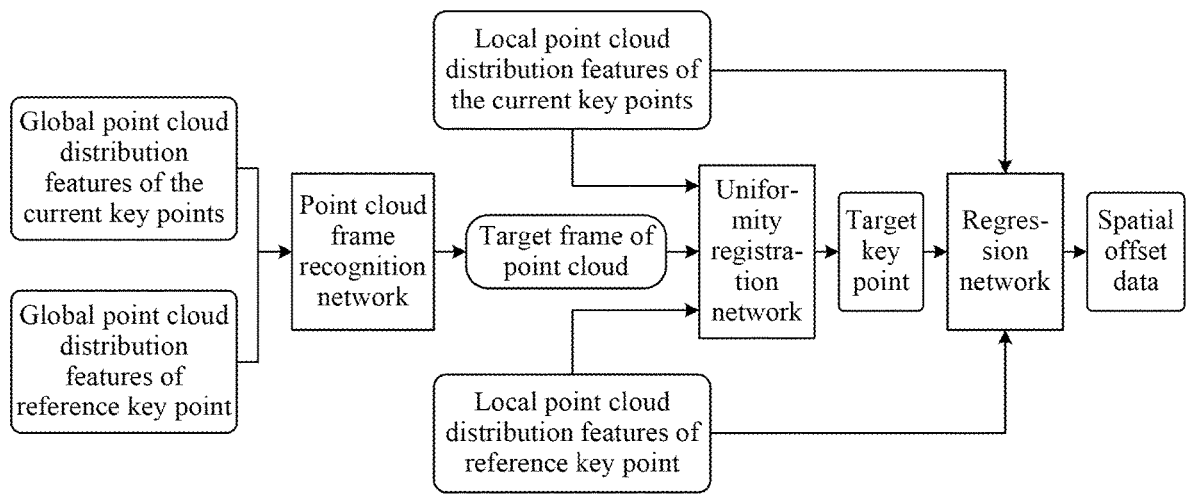
FIG. 4B is a diagram illustrating the structure of another key point matching network according to an embodiment of the present disclosure.

In one optional embodiment, referring to the key point matching network as shown in FIG. 4B, based on FIG. 2D, a regression network is added. For each current key point, the regression network is configured for estimating the spatial offset data between the current key point and a corresponding target key point according to the local point cloud distribution feature of the current key point and the local point cloud distribution feature of the corresponding target key point and representing the position difference between the current key point and the corresponding target key point. The regression network may be implemented based on a machine learning model in the related art, for example, an iterative closest point (ICP).

In one optional embodiment, the fusion local point cloud distribution feature of the current key point and the fusion local point cloud distribution feature of the corresponding target key point may be also input into the regression network to obtain the spatial offset data.

It is to be noted that due to the included inter-key point distribution feature, the fusion local point cloud distribution feature represents the distribution relation between a key point and other key points in the point cloud frame to which the key point belongs and has a global feature. When the spatial offset data is determined, more attention is paid to the feature differences between the current key points and the target key points, so there exists poor accuracy of determination results of the spatial offset data caused by introduction of irrelevant information when the fusion local point cloud distribution feature is used. Therefore, generally, the local point cloud distribution feature of the current key point and the local point cloud distribution feature of the corresponding target key point are directly used for determining the spatial offset data.

In this embodiment of the present disclosure, the position relation between the current key point and the target key point is mapped by introduction of the relative pose data so that the current pose data of the current key point may be determined according to the reference pose data of the target key point, eliminating the influence caused by different key point collection terminals and helping enlarge the application scope of the positioning method.

As an implementation of the preceding positioning methods, the present disclosure further provides an optional embodiment of an execution apparatus for implementing the positioning methods. The execution apparatus may be implemented by software and/or hardware and is specifically configured in an electrical device.

Figure 5:
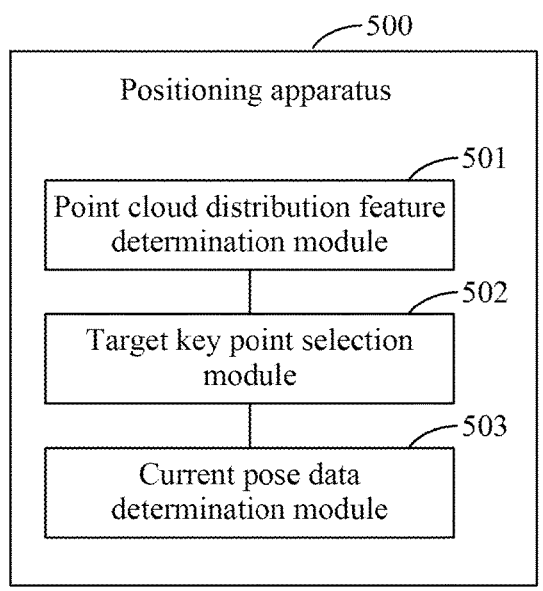
FIG. 5 is a diagram illustrating the structure of a positioning apparatus according to an embodiment of the present disclosure.

Further, referring to FIG. 5, a positioning apparatus 500 includes a point cloud distribution feature determination module 501, a target key point selection module 502 and a current pose data determination module 503.

The point cloud distribution feature determination module 501 is configured to, according to the current frame of point cloud data collected by a to-be-positioned terminal in a travelling environment, determine the current key point in the current frame of point cloud data and a point cloud distribution feature of the current key point.

The target key point selection module 502 is configured to, according to point cloud distribution features associated with reference key points in a global positioning map and the point cloud distribution feature of the current key point, select a target key point matching the current key point from the reference key points.

The current pose data determination module 503 is configured to, according to reference pose data associated with the target key point, determine the current pose data of the to-be-positioned terminal.

In this embodiment of the present disclosure, the target key point matching the current key point is searched in the global positioning map through introduction of the point cloud distribution feature of the current key point in the current frame of point cloud data of the to-be-positioned terminal so that the pose data of the to-be-positioned terminal can be determined according to the reference pose data associated with the target key point, and a terminal can be still positioned without relying on GPS data when the GPS is blocked or a GPS signal is weak, thereby improving the universality of the positioning method.

In one optional embodiment, the point cloud distribution feature includes a global point cloud distribution feature and a local point cloud distribution feature.

In one optional embodiment, the target key point selection module 502 includes a target point cloud frame selection unit and a target key point selection unit.

The target point cloud frame selection unit is configured to, according to a global point cloud distribution feature of the current key point and global point cloud distribution features of the reference key points, select a target frame of point cloud matching the current frame of point cloud from reference frames of point clouds in the global positioning map. The target key point selection unit is configured to, according to local point cloud distribution features of reference key points of the target frame of point cloud and a local point cloud distribution feature of the current key point, select a target key point from the reference key points of the target frame of point cloud.

In one optional embodiment, the target key point selection module 502 further includes an inter-key point distribution feature determination module, a global feature fusion unit and/or a local feature fusion unit.

The inter-key point distribution feature determination module is configured to, according to point cloud data of key points, determine an inter-key point distribution feature of each of the key points in a respective point cloud frame. The key points include the current key points and the reference key points.

The global feature fusion unit is configured to, according to the inter-key point distribution feature and a global point cloud distribution feature, determine fusion global point cloud distribution features of the key points.

The local feature fusion unit is configured to, according to the inter-key point distribution feature and a local point cloud distribution feature, determine fusion local point cloud distribution features of the key points.

In one optional embodiment, the target point cloud frame selection unit includes a target point cloud frame selection subunit.

The target point cloud frame selection subunit is configured to, according to fusion global point cloud distribution features of the current key points and fusion global point cloud distribution features of the reference key points, select a target frame of point cloud matching the current frame of point cloud from the reference frames of point clouds in the global positioning map.

In one optional embodiment, the target key point selection unit includes target key point selection subunit.

The target key point selection subunit is configured to, according to fusion local point cloud distribution features of the reference key points of the target frame of point cloud and fusion local point cloud distribution features of the current key points, select the target key points from the reference key points of the target frame of point cloud.

In one optional embodiment, the target point cloud frame selection subunit includes a candidate point cloud frame selection secondary unit and a target point cloud frame selection secondary unit.

The candidate point cloud frame selection secondary unit is configured to perform a cluster analysis on the current frame of point cloud and the reference frames of point clouds to select candidate frames of point clouds from the reference frames of point clouds according to the global point cloud distribution feature of the current key point and the global point cloud distribution features of the reference frames of point clouds in the global positioning map.

The target point cloud frame selection secondary unit is configured to, according to the distance between the global point cloud distribution features of the current key points and global point cloud distribution features of reference key points of the candidate frames of point clouds, select a target frame of point cloud closer to the current frame of point cloud from the candidate frames of point clouds.

In one optional embodiment, the current pose data determination module 503 includes a relative pose data determination unit and a current pose data determination unit.

The relative pose data determination unit is configured to, according to a local point cloud distribution feature of the target key point and a local point cloud distribution feature of the current key point, determine the relative pose data between the current key point and the target key point.

The current pose data determination unit is configured to, according to the reference pose data associated with the target key point and according to the relative pose data, determine the current pose data of the to-be-positioned terminal.

In one optional embodiment, the relative pose data determination unit includes a spatial offset data determination subunit, a spatial pose correction subunit and a relative pose data determination subunit.

The spatial offset data determination subunit is configured to, for each current key point, according to a local point cloud distribution feature of the current key point and a local point cloud distribution feature of a corresponding target key point, determine the spatial offset data between the current key point and the corresponding target key point.

The spatial pose correction subunit is configured to, according to the spatial offset data, correct the spatial position of the current key point.

The relative pose data determination subunit is configured to, according to point cloud data of the corrected current key point and point cloud data of the corresponding target key point, determine the relative pose data.

In one optional embodiment, the point cloud distribution feature determination module 501 includes a current key point extraction unit, a global feature determination unit and a local feature determination unit.

The current key point extraction unit is configured to extract the current key points from the current frame of point cloud data.

The global feature determination unit is configured to, according to the relative position relation between different current key points in the current frame of point cloud data, determine the global point cloud distribution feature of the current key point.

The local feature determination unit is configured to, according to the relative position relation between neighboring collection points in a neighborhood to which each current key point belongs, determine a local point cloud distribution feature of the each current key point.

The preceding positioning apparatus may perform the positioning methods according to any embodiment of the present disclosure and has corresponding functional modules and beneficial effects for performing the positioning methods.

In the technical solutions of the present disclosure, the collection, storage, use, processing, transmission, provision, and disclosure of the current frame of point cloud data involved are in compliance with provisions of relevant laws and regulations and do not violate public order and good customs.

According to embodiments of the present disclosure, the present disclosure further provides an electronic device, a readable storage medium and a computer program product.

Figure 6:
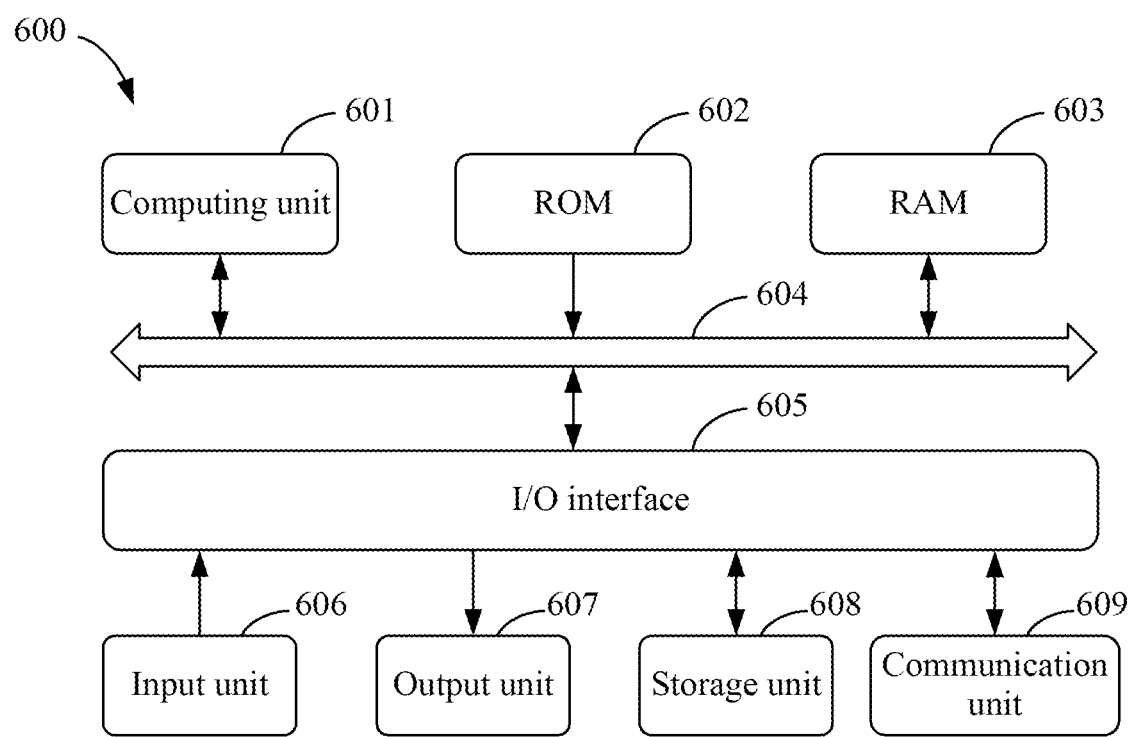
FIG. 6 is a block diagram of an electronic device for implementing a positioning method according to an embodiment of the present disclosure.

FIG. 6 is a block diagram illustrating an example electronic device 600 for implementing the embodiments of the present disclosure. The electronic device is intended to represent various forms of digital computers, for example, a laptop computer, a desktop computer, a worktable, a personal digital assistant, a server, a blade server, a mainframe computer or another applicable computer. The electronic device may also represent various forms of mobile devices, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various types of appropriate operations and processing based on a computer program stored in a read-only memory (ROM) 602 or a computer program loaded from a storage unit 608 to a random-access memory (RAM) 603. Various programs and data required for operations of the device 600 may also be stored in the RAM 603. The computing unit 601, the ROM 602 and the RAM 603 are connected to each other by a bus 604. An input/output (I/O) interface 605 is also connected to the bus 604.

Multiple components in the device 600 are connected to the I/O interface 605. The components include an input unit 606 such as a keyboard and a mouse, an output unit 607 such as various types of displays and speakers, the storage unit 608 such as a magnetic disk and an optical disc, and a communication unit 609 such as a network card, a modem and a wireless communication transceiver. The communication unit 609 allows the device 600 to exchange information/data with other devices over a computer network such as the Internet and/or various telecommunication networks.

The computing unit 601 may be various general-purpose and/or special-purpose processing components having processing and computing capabilities. Examples of the computing unit 601 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 601 performs the various methods and processes described above, such as a positioning method. For example, in some embodiments, the positioning method may be implemented as computer software programs tangibly embodied in a machine-readable medium, such as the storage unit 608. In some embodiments, part or all of computer programs may be loaded and/or installed on the device 600 via the ROM 602 and/or the communication unit 609. When the computer program is loaded to the RAM 603 and executed by the computing unit 601, one or more steps of the positioning method described above may be executed. Alternatively, in other embodiments, the computing unit 601 may be configured, in any other suitable manners (e.g., by means of firmware), to perform the positioning method.

Various implementations of the systems and technologies described above herein may be achieved in digital electronic circuit systems, integrated circuit systems, field-programmable gate arrays (FPGAs), application-specific integrated circuits (ASICs), application-specific standard products (ASSPs), systems on chip (SOCs), complex programmable logic devices (CPLDs), computer hardware, firmware, software and/or combinations thereof. These various implementations may include implementation in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting data and instructions to the memory system, the at least one input device and the at least one output device.

The present disclosure further provides a self-driving vehicle provided with any of the preceding electronic devices.

Program codes for implementing the exemplary methods of the present disclosure may be compiled in any combination of one or more programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

The computing system may include clients and servers. The clients and servers are usually far away from one another and generally interact through the communication network. The relationship between the clients and the servers arises by use of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and virtual private server (VPS) services. The server may also be a server of a distributed system, or a server combined with a blockchain.

Artificial intelligence is the study of making computers simulate certain human thinking processes and intelligent behaviors (such as learning, reasoning, thinking and planning) both at the hardware and software levels. Artificial intelligence hardware technologies generally include technologies such as sensors, dedicated artificial intelligence chips, cloud computing, distributed storage and big data processing. Artificial intelligence software technologies mainly include several major technologies such as computer vision technologies, speech recognition technologies, natural language processing technologies, machine learning/deep learning, big data processing technologies and knowledge mapping technologies.

Cloud computing refers to a technical system that accesses a shared elastic-and-scalable physical or virtual resource pool through a network, where resources may include servers, operating systems, networks, software, applications and storage devices, and may be deployed and managed in an on-demand, self-service manner by cloud computing. Cloud computing can provide efficient and powerful data processing capabilities for artificial intelligence, the blockchain and other technical applications and model training.

It is to be understood that various forms of the preceding flows may be used with steps reordered, added, or removed. For example, the steps described in the present disclosure may be executed in parallel, in sequence or in a different order as long as the desired result of the technical solutions disclosed in the present disclosure is achieved. The execution sequence of these steps is not limited herein.

The scope of the present disclosure is not limited to the preceding exemplary embodiments. It is to be understood by those skilled in the art that various modifications, combinations, subcombinations and substitutions may be made according to design requirements and other factors. Any modification, equivalent substitution, improvement and the like made within the spirit and principle of the present disclosure falls within the scope of the present disclosure.

What is claimed is:

1. A positioning method, comprising:
    determining, according to a current frame of point cloud data collected by a to-be-positioned terminal in a travelling environment, a current key point in the current frame of point cloud data and a point cloud distribution feature of the current key point;
    selecting, according to point cloud distribution features associated with reference key points in a global positioning map and the point cloud distribution feature of the current key point, a target key point matching the current key point from the reference key points; and
    determining, according to reference pose data associated with the target key point, current pose data of the to-be-positioned terminal,
    wherein the point cloud distribution feature comprises a global point cloud distribution feature and a local point cloud distribution feature;
    wherein the selecting, according to the point cloud distribution features associated with the reference key points in the global positioning map and the point cloud distribution feature of the current key point, the target key point matching the current key point from the reference key points comprises:
        selecting, according to a global point cloud distribution feature of the current key point and global point cloud distribution features of the reference key points, a target frame of point cloud matching a current frame of point cloud from reference frames of point clouds in the global positioning map; and
        selecting, according to local point cloud distribution features of reference key points of the target frame of point cloud and a local point cloud distribution feature of the current key point, the target key point from the reference key points of the target frame of point cloud.

2. The method according to claim 1, further comprising:
    determining, according to point cloud data of key points, an inter-key point distribution feature of each of the key points in a respective point cloud frame, wherein the key points comprise current key points and the reference key points;
    determining, according to the inter-key point distribution feature and the global point cloud distribution feature, fusion global point cloud distribution features of the key points; and/or
    determining, according to the inter-key point distribution feature and the local point cloud distribution feature, fusion local point cloud distribution features of the key points.

3. The method according to claim 2, wherein the selecting, according to the global point cloud distribution feature of the current key point and the global point cloud distribution features of the reference key points, the target frame of point cloud matching the current frame of point cloud from the reference frames of point clouds in the global positioning map comprises:
    selecting, according to a fusion global point cloud distribution feature of the current key point and fusion global point cloud distribution features of the reference key points, the target frame of point cloud matching the current frame of point cloud from the reference frames of point clouds in the global positioning map.

4. The method according to claim 2, wherein the selecting, according to the local point cloud distribution features of the reference key points of the target frame of point cloud and the local point cloud distribution feature of the current key point, the target key point from the reference key points of the target frame of point cloud comprises:

selecting, according to fusion local point cloud distribution features of the reference key points of the target frame of point cloud and a fusion local point cloud distribution feature of the current key point, the target key point from the reference key points of the target frame of point cloud.

5. The method according to claim 1, wherein selecting, according to the global point cloud distribution feature of the current key point and the global point cloud distribution features of the reference key points, the target frame of point cloud matching the current frame of point cloud from the reference frames of point clouds in the global positioning map comprises:

performing a cluster analysis of the current frame of point cloud and the reference frames of point clouds according to the global point cloud distribution feature of the current key point and global point cloud distribution features of the reference frames of point clouds in the global positioning map to select candidate frames of point clouds in a same category as the current frame of point cloud from the reference frames of point clouds; and selecting, according to a distance between the global point cloud distribution feature of the current key point and global point cloud distribution features of reference key points of the candidate frames of point clouds, a target frame of point cloud closer to the current frame of point cloud from the candidate frames of point clouds.

6. The method according to claim 1, wherein the determining, according to the reference pose data associated with the target key point, the current pose data of the to-be-positioned terminal comprises:

determining, according to a local point cloud distribution feature of the target key point and a local point cloud distribution feature of the current key point, relative pose data between the current key point and the target key point; and determining, according to the reference pose data associated with the target key point and according to the relative pose data, the current pose data of the to-be-positioned terminal.

7. The method according to claim 6, wherein determining, according to the local point cloud distribution feature of the target key point and the local point cloud distribution feature of the current key point, the relative pose data between the current key point and the target key point comprises:

for each current key point, determining, according to a local point cloud distribution feature of the each current key point and a local point cloud distribution feature of a corresponding target key point, spatial offset data between the each current key point and the corresponding target key point;

correcting a spatial position of the each current key point according to the spatial offset data; and determining the relative pose data according to point cloud data of the each corrected current key point and point cloud data of the corresponding target key point.

8. The method according to claim 1, wherein determining, according to the current frame of point cloud data collected by the to-be-positioned terminal in the travelling environment, the current key point in the current frame of point cloud data and the point cloud distribution feature of the current key point comprises:

extracting the current key point from the current frame of point cloud data;

determining, according to a relative position relation between different current key points in the current frame of point cloud data, a global point cloud distribution feature of the current key point; and determining, according to a relative position relation between neighboring collection points in a neighborhood to which each current key point belongs, a local point cloud distribution feature of the each current key point.

9. An electronic device, comprising:

at least one processor; and a memory communicatively connected to the at least one processor, wherein the memory is configured to store instructions executable by the at least one processor to cause the at least one processor to perform:

determining, according to a current frame of point cloud data collected by a to-be-positioned terminal in a travelling environment, a current key point in the current frame of point cloud data and a point cloud distribution feature of the current key point;

selecting, according to point cloud distribution features associated with reference key points in a global positioning map and the point cloud distribution feature of the current key point, a target key point matching the current key point from the reference key points; and determining, according to reference pose data associated with the target key point, current pose data of the to-be-positioned terminal, wherein the point cloud distribution feature comprises a global point cloud distribution feature and a local point cloud distribution feature, and wherein the selecting, according to the point cloud distribution features associated with the reference key points in the global positioning map and the point cloud distribution feature of the current key point, the target key point matching the current key point from the reference key points comprises:

selecting, according to a global point cloud distribution feature of the current key point and global point cloud distribution features of the reference key points, a target frame of point cloud matching a current frame of point cloud from reference frames of point clouds in the global positioning map; and selecting, according to local point cloud distribution features of reference key points of the target frame of point cloud and a local point cloud distribution feature of the current key point, the target key point from the reference key points of the target frame of point cloud.

10. The electronic device according to claim 9, further comprising:

determining, according to point cloud data of key points, an inter-key point distribution feature of each of the key points in a respective point cloud frame, wherein the key points comprise current key points and the reference key points;

determining, according to the inter-key point distribution feature and the global point cloud distribution feature, fusion global point cloud distribution features of the key points; and/or determining, according to the inter-key point distribution feature and the local point cloud distribution feature, fusion local point cloud distribution features of the key points.

11. The electronic device according to claim 10, wherein the selecting, according to the global point cloud distribution feature of the current key point and the global point cloud distribution features of the reference key points, the target frame of point cloud matching the current frame of point cloud from the reference frames of point clouds in the global positioning map comprises:

selecting, according to a fusion global point cloud distribution feature of the current key point and fusion global point cloud distribution features of the reference key points, the target frame of point cloud matching the current frame of point cloud from the reference frames of point clouds in the global positioning map.

12. The electronic device according to claim 10, wherein the selecting, according to the local point cloud distribution features of the reference key points of the target frame of point cloud and the local point cloud distribution feature of the current key point, the target key point from the reference key points of the target frame of point cloud comprises:

selecting, according to fusion local point cloud distribution features of the reference key points of the target frame of point cloud and a fusion local point cloud distribution feature of the current key point, the target key point from the reference key points of the target frame of point cloud.

13. The electronic device according to claim 9, wherein selecting, according to the global point cloud distribution feature of the current key point and the global point cloud distribution features of the reference key points, the target frame of point cloud matching the current frame of point cloud from the reference frames of point clouds in the global positioning map comprises:

performing a cluster analysis of the current frame of point cloud and the reference frames of point clouds according to the global point cloud distribution feature of the current key point and global point cloud distribution features of the reference frames of point clouds in the global positioning map to select candidate frames of point clouds in a same category as the current frame of point cloud from the reference frames of point clouds; and selecting, according to a distance between the global point cloud distribution feature of the current key point and global point cloud distribution features of reference key points of the candidate frames of point clouds, a target frame of point cloud closer to the current frame of point cloud from the candidate frames of point clouds.

14. The electronic device according to claim 9, wherein the determining, according to the reference pose data associated with the target key point, the current pose data of the to-be-positioned terminal comprises:

determining, according to a local point cloud distribution feature of the target key point and a local point cloud distribution feature of the current key point, relative pose data between the current key point and the target key point; and determining, according to the reference pose data associated with the target key point and according to the relative pose data, the current pose data of the to-be-positioned terminal.

15. The electronic device according to claim 14, wherein determining, according to the local point cloud distribution feature of the target key point and the local point cloud distribution feature of the current key point, the relative pose data between the current key point and the target key point comprises:

for each current key point, determining, according to a local point cloud distribution feature of the each current key point and a local point cloud distribution feature of a corresponding target key point, spatial offset data between the each current key point and the corresponding target key point;

correcting a spatial position of the each current key point according to the spatial offset data; and determining the relative pose data according to point cloud data of the each corrected current key point and point cloud data of the corresponding target key point.

16. The electronic device according to claim 9, wherein determining, according to the current frame of point cloud data collected by the to-be-positioned terminal in the travelling environment, the current key point in the current frame of point cloud data and the point cloud distribution feature of the current key point comprises:

extracting the current key point from the current frame of point cloud data;

determining, according to a relative position relation between different current key points in the current frame of point cloud data, a global point cloud distribution feature of the current key point; and determining, according to a relative position relation between neighboring collection points in a neighborhood to which each current key point belongs, a local point cloud distribution feature of the each current key point.

17. A non-transitory computer-readable storage medium storing computer instructions for causing a computer to perform a positioning method, wherein the positioning method comprises:

determining, according to a current frame of point cloud data collected by a to-be-positioned terminal in a travelling environment, a current key point in the current frame of point cloud data and a point cloud distribution feature of the current key point;

selecting, according to point cloud distribution features associated with reference key points in a global positioning map and the point cloud distribution feature of the current key point, a target key point matching the current key point from the reference key points; and determining, according to reference pose data associated with the target key point, current pose data of the to-be-positioned terminal, wherein the point cloud distribution feature comprises a global point cloud distribution feature and a local point cloud distribution feature, and wherein the selecting, according to the point cloud distribution features associated with the reference key points in the global positioning map and the point cloud distribution feature of the current key point, the target key point matching the current key point from the reference key points comprises:

selecting, according to a global point cloud distribution feature of the current key point and global point cloud distribution features of the reference key points, a target frame of point cloud matching a current frame of point cloud from reference frames of point clouds in the global positioning map; and selecting, according to local point cloud distribution features of reference key points of the target frame of point cloud and a local point cloud distribution feature of the current key point, the target key point from the reference key points of the target frame of point cloud.

\* \* \* \* \*